July 29, 1952 — R. E. L. TRUBERT — 2,604,901
COMBINED SAFETY VALVE DEVICE
Filed Feb. 27, 1948
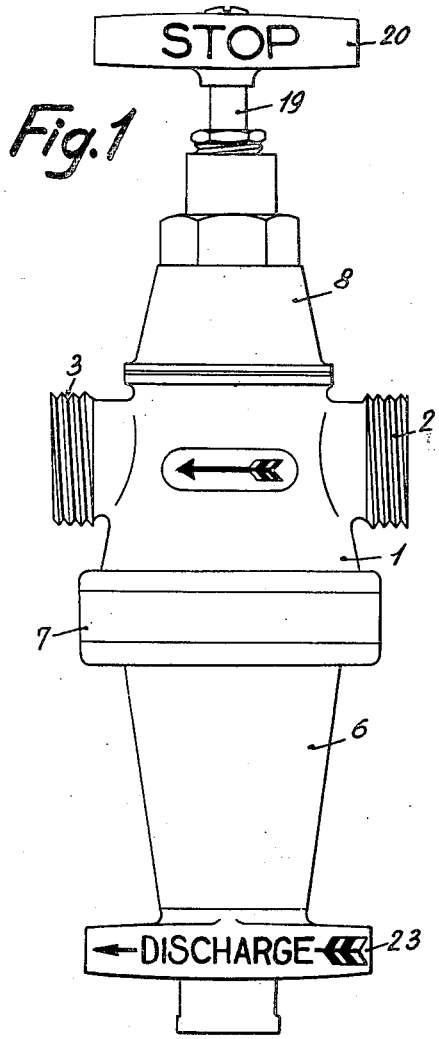
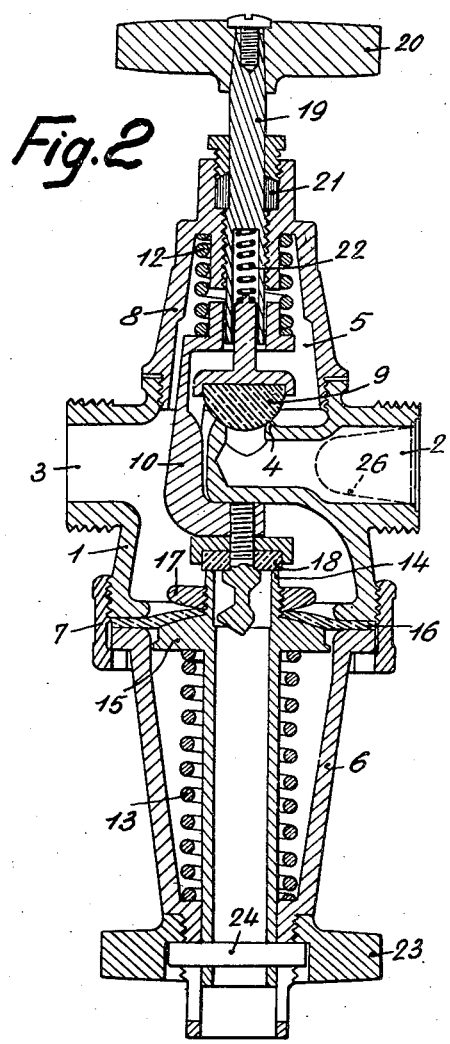
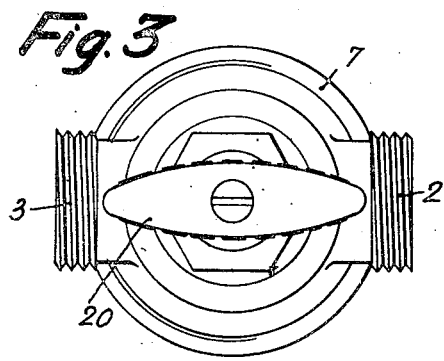
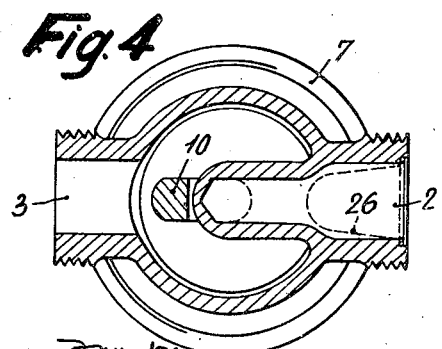

Patented July 29, 1952

2,604,901

UNITED STATES PATENT OFFICE 2,604,901

COMBINED SAFETY VALVE DEVICE

René Eugène Léon Trubert, Viroflay, France

Application February 27, 1948, Serial No. 11,752
In France November 30, 1945

Section 1, Public Law 690, August 8, 1946
Patent expires November 30, 1965

7 Claims. (Cl. 137—115)

The present invention relates to a combined safety valve device more specially designed for use in connection with accumulation water-heaters.

It is well known that an accumulation water-heater generally comprises a heat-insulated tank fed with water through an induction passage in its lower part, the water being heated therein while under pressure and thereafter supplied according to requirements by means of an outlet conduit or pipe connected to the upper part of the tank.

In order to operate such a water-heater in good condition, the pipe lines have to be provided with a filter, a stop valve, a non-return valve, a safety valve with a discharge funnel-like member and an emptying arrangement. This equipment is somewhat intricate, and combined devices adapted to fulfil these requirements, wholly or partly, have been established.

It is an object of the present invention to provide a combined safety valve device to serve all purposes hereinbefore described and furthermore comprising a pressure reducer, which will permit the use of water-heater tanks tested at a lower pressure as the said reducer will also act as a safety valve far more reliable than those heretofore in use.

The combined valve device according to this invention does not comprise any novel feature, but is an apt combination of means already known designed to obtain the desired results, namely: to feed an accumulation water-heater with water at a constant and lowered pressure, to prevent any return flow, to close the inflow of water and also to empty the water-heater. The device will thus be a combination of a pressure reducer, a non-return valve, a stop valve, a safety valve, a discharge valve and a filter.

The objects of this invention will be described more fully thereafter with reference to the accompanying drawings showing by way of example one embodiment of the invention and wherein like reference characters refer to like parts in the several views.

In the drawings:

Figure 1 is an elevational view of the device according to my invention;

Figure 2 is a corresponding vertical sectional view;

Figure 3 is a top plan view; and

Figure 4 is a transverse sectional view taken along the axes of the inlet and outlet conduits.

In the body of the device generally indicated with numeral character 1 are formed the inlet passage 2 leading through the seat 4 into the lowered pressure chamber 5, to which is also connected the outlet passage 3. The body has screwed thereto an upper part 8, and a lower part 6 also screw-threadedly secured by means of a nut 7. A partly screw-threaded spindle 19 engages the inside of the upper part 8, and is actuated to stop manually the inflow of water by way of a button or hand wheel 20 suitably secured to its upper end while its free end is bored to slidably receive the upstanding stem projecting from the inlet valve 9 which is urged towards the seat thereof by means of a small spring 22 constrained between the end wall of the bore and the valve stem. The coupling of the spindle 19 inside the upper part 8 is watertight due to a stuffing box, or packing, 21. A valve support 10 has its upper end formed in a sleeve-like flanged portion which slidably receives the bored lower end of the spindle 19 and may be urged downwardly by a spring 12 bearing upon the flange of the said support. The bottom of the lowered pressure chamber is constituted of a diaphragm 16 having its periphery secured between the body 1 and the lower part 6 of the device, and also pressed by means of a nut 17 upon a flange integral with a tube-like channelled piston which is thus water-tight. The piston 15 has an upper seat 14 which is normally held in contact with a discharge valve 18 screw-threadedly secured to the lower end of the valve support 10, by the biasing action of a spring 13 coiled about said piston 15 and constrained between the bottom of the lower part 6 and the underside of the flange integral with the channelled piston 15. The lower part of the piston 15 is fitted with a pin 24, integral therewith or suitably secured thereto, to be manually actuated by a hand wheel, or nut, 23 for discharge of the water. The safety valve device is also provided with a filter 26 inside the induction passage 2, and a conventional discharge funnel-like member not shown.

The safety valve device according to my invention is operated as follows:

The hand wheel 20 being loosened to its open position, the inflow of water from the induction conduit 2 raises the valve 9, enters the chamber 5, presses the diaphragm 16 and the spring 13; the valve support 10 being thus no longer raised by the piston 15 is urged downwardly by the combined action of the spring 12 and the pressure in the chamber 5, whereby the valve 9 closes the intake seat 4. The inflow of water is therefore prevented unless the pressure upon the diaphragm is weaker than the valve corresponding to the tension force of the spring 13 which therefore will have to be adjusted according to the required lowered pressure.

It is to be noted that the two springs 12, 13 and the small spring 22 acting of the valve 9 are entirely different. By way of example, the strength of the small spring may be 200 grams while that of the spring 12 is 5 kilogs. and will be sufficient to close the water inflow through a seat 4 having an area of one half square centimetre, on condition that the water pressure should not be above 10 kilogs., which is usually the case. When the pressure is higher, in which case the water-heater cannot be connected direct with the water piping, it will be found sufficient to restrict the cross area of the seat 4. The spring 13, however, has to be much stronger; even supposing that the area of the diaphragm should not exceed 10 square centimeters, the strength of the spring necessary to prevent the diaphragm from yielding to a pressure less than 2 kilogs. will have to come up to 20 kilogs., to which are to be added the 5 kilogs. of the counter force exerted by the spring 12, which means an over-all tension value of 25 kilogs. in its operating position.

Let us suppose now that for some reason the pressure should build up inside the water-heater for instance owing to the dilatation of the water while it is being heated; the force acting upon the upper side of the diaphragm will then increase whereby the spring 13 will be brought to yield and accordingly the seat 14 will be urged downwards. The valve 18 will not, however, come down as it is secured to the valve support 10, which, in turn, is stopped by the valve 9 abutting on the seat 4. A discharge of water will therefore take place through the aperture thus provided above the seat 14.

Thus it will be readily understood that unlike a common safety valve which is generally opened only by a substantial overpressure, the pressure reducer, which keeps the water inflow closed as long the pressure in the outlet conduits does not decrease, will also open the discharge orifice provided by the valve 18 as soon as the pressure shows a tendency to decrease.

The other objects and purposes of the device according to my invention are operated as follows:

The inlet valve 9 acts as a non-return valve, as it moves freely and is furthermore slightly urged on its seat by a small spring.

The manually operated nut 20 actuates, by way of the spindle 19, the valve 9 to maintain it firmly on its seat, thus acting as a stop valve.

The tank may be emptied when desired by operated the hand wheel 23 which rotation will actuate the pin 24 and thereby the piston 15 thus causing the seat 14 to be urged downwardly to open the discharge valve 18 whereby the water will be discharged through the passage provided inside the piston 15.

A discharge funnel-shaped member at the lower part of the device will permit visual control of the discharge outflow to prevent any blocking up of the discharge pipe.

The nut 20 will be indicated "stop" and the nut 23 will likewise bear a mention "discharge," with corresponding arrows, so that the apparatus may be most conveniently utilised.

Although one embodiment of the present invention has been illustrated and described, it is to be expressly understood that the invention is not limited thereto. Various changes may be made in the design and arrangement of the parts without departing from the spirit and scope of the invention as the same will now be understood by those skilled in the art.

I claim:

1. A safety valve for closed tanks, and more particularly for accumulation for water heaters, including a valve casing having a valve chamber; a first valve seat in the casing and an inlet port in the latter leading to the first valve seat; a movable intake valve member adapted to cooperate with said first valve seat; a first outlet port in said valve casing; a valve support member in said valve casing movable from an inoperative position into an operative position urging said intake valve member toward said first valve seat; spring means biasing the valve support member in one direction into said operative position; a discharge valve member carried by said valve support member; a tubular discharge member formed with a valve seat at one end thereof within said valve chamber to cooperate with the discharge valve member, said tubular discharge member communicating at said one end with said valve chamber when said discharge valve member is not seated; a second outlet port in said valve casing communicating with the other end of said tubular discharge member; a diaphragm closing the valve chamber in respect to said second outlet port in said valve casing and having a central portion surrounding said tubular discharge member spaced from either end thereof and secured thereto; a spring in said valve casing abutting against a flange of said tubular discharge member and biasing said tubular discharge member in a direction opposite to said one direction and against the action of said spring means against said discharge valve member so as to keep said valve support member in inoperative position; and manually operable means for urging said intake valve member into closing relation with said first valve seat independently of the positions of said valve support member and diaphragm.

2. A safety valve for closed tanks, and more particularly for accumulation for water heaters, including a valve casing having a valve chamber; a first valve seat in the casing and an inlet port in the latter leading to the first valve seat; a movable intake valve member adapted to cooperate with said first valve seat a first outlet port in said valve casing; a valve support member in said valve casing movable from an inoperative position into an operative position urging said intake valve member toward said first valve seat; a small spring bearing against said intake valve member and permanently urging the same against said first valve seat; spring means biasing the valve support member in one direction into said operative position; a discharge valve member carried by said valve support member; a tubular discharge member formed with a valve seat at one end thereof within said valve chamber to cooperate with the discharge valve member, said tubular discharge member communicating at said one end with said valve chamber when said discharge valve member is not seated; a second outlet port in said valve casing communicating with the other end of said tubular discharge member; a diaphragm closing the valve chamber in respect to said second outlet port in said valve casing and having a central portion surrounding said tubular discharge member spaced from either end thereof and secured thereto; a spring in said valve casing abutting against a flange in said tubular discharge member and biasing said tubular discharge member in a position opposite to said one direction and against the action of said spring means against said discharge valve member so as to keep said valve support member in inoperative position; and manually operable means for urging said intake valve member into closing relation with said first valve seat independently of the positions of said valve support member and diaphragm.

3. A safety valve for closed tanks, and more particularly for accumulation for water heaters, including a valve casing having a valve chamber; a first valve seat in the casing and an inlet port in the latter leading to the first valve seat; a movable intake valve member adapted to cooperate with said first valve seat; a first outlet port in said valve casing; a valve support member in said valve casing movable from an inoperative position into an operative position urging said intake valve member toward said first valve seat; spring means biasing the valve support member in one direction into said operative position; a discharge valve member carried by said valve support member; a tubular discharge member formed with a valve seat at one end thereof within said valve chamber to cooperate with the discharge valve member, said tubular discharge member communicating at said one end with said valve chamber when said discharge valve member is not seated; a second outlet port in said valve casing communicating with the other end of said tubular discharge member; a diaphragm closing the valve chamber in respect to said second outlet port in said valve casing and having the central portion surrounding said discharge member spaced from either end thereof and secured thereto; a spring in said valve casing abutting against a flange on said discharge member and biasing said tubular discharge member in a direction opposite to said one direction and against the action of said spring means against said discharge valve member so as to keep said valve support member in operative position; manually operable means for positively separating said tubular discharge member from said discharge valve member at will; and manually operable means for urging said intake valve member into closing relation with said first valve seat independently of the position of said valve support member and diaphragm.

4. A safety valve for closed tanks, and more particularly for accumulation for water heaters, including a valve casing having a valve chamber; a first valve seat in the casing and an inlet port in the latter leading to the first valve seat; a filter located in the inlet port; a movable intake valve member adapted to cooperate with said first valve seat; a first outlet port in said valve casing; a valve support member in said valve casing movable from an inoperative position into an operative position urging said intake valve member toward said first valve seat; spring means biasing the valve support member in one direction into said operative position; a discharge valve member carried by said valve support member; a tubular discharge member formed with a valve seat at one end thereof within said valve chamber to cooperate with the discharge valve member, said tubular discharge member communicating at said one end with said valve chamber when said discharge valve member is not seated; a second outlet port in said valve casing communicating with the other end of said tubular discharge member; a diaphragm closing the valve chamber in said valve casing in respect to said second outlet port and having a central portion surrounding said tubular discharge member spaced from either end thereof and secured thereto; a spring in said valve casing abutting against a flange on said discharge member and biasing said tubular discharge member in a direction opposite to said one direction and against the action of said spring means against said discharge valve member so as to keep said valve support member in inoperative position; and manually operable means for urging said intake valve member into closing relation with said first valve seat independently of the positions of said valve support member and diaphragm.

5. A safety valve for closed tanks, and more particularly for accumulation for water heaters, including a valve casing having a valve chamber; a first valve seat in the casing and an inlet port in the latter leading to the first valve seat; a movable intake valve member adapted to cooperate with said first valve seat; a first outlet port in said valve casing; a valve support member in the latter having a portion slidably receiving said intake valve member and movable from an inoperative position into an operative position urging said intake valve member toward said first valve seat; spring means biasing the valve support member in one direction into said operative position; a discharge valve member carried by said valve support member; a tubular discharge member formed with a valve seat at one end thereof within said valve chamber to cooperate with the discharge valve member, said tubular discharge member communicating at said one end with said valve chamber when said discharge valve member is not seated; a second outlet port in said valve casing communicating with the other end of said tubular discharge member; a diaphragm closing the valve chamber in respect to said second outlet port in said valve casing and having the central portion surrounding said tubular discharge member spaced from either end thereof and secured thereto; a lower casing section containing the lower portion of said tubular discharge member and having a peripheral portion engaging with the periphery of the diaphragm and clamping said periphery of the latter between the same and said valve casing; a spring in said valve casing abutting against a flange on said discharge member and biasing said tubular discharge member in a direction opposite to said one direction and against the action of said spring means against said discharge valve member so as to keep said valve support member in inoperative position; an upper hollow casing section upon said valve casing; and manually operable means extending through said hollow upper casing section for urging said intake valve member into closing relation with said first valve seat independently of the positions of said valve support member and diaphragm.

6. A safety valve for closed tanks, and more particularly for accumulation for water heaters, including a valve casing having a lateral inlet port and a lateral outlet port; a first valve seat in the valve casing communicating with the inlet port, said valve casing having a valve chamber between said first valve seat and said outlet port; an upper casing section for upwardly closing the valve chamber; a lower casing section having a further outlet port; a diaphragm disposed between said upper valve casing section and the lower casing section with the periphery thereof clamped therebetween; a substantially vertical tubular discharge member secured to the central portion of said diaphragm and projecting with its upper end into said upper casing section, and with its lower end into said lower casing section and communicating at its upper end with said valve chamber and at its lower end with said further outlet port; a second valve seat formed at the upper end of said tubular discharge member; a valve support mounted for vertical movement in said valve chamber; a discharge valve member carried by said valve support member above said tubular discharge member in effective position to cooperate with the second valve seat upon said tubular discharge member; a spring located in the upper casing section and biasing said valve support member downward, the latter having a hollow portion directed downward; an intake valve member disposed above the first valve seat communicating with said inlet port mounted for sliding movement in a hollow portion of said valve support member and adapted to be moved into closing position by said valve support member when the same moves downward; spring means located in said lower casing section abutting against a flange on said tubular discharge member and urging the same and said valve support member upwards against the action of said spring; a threaded vertical rod screwed into said upper casing section above said intake valve member; manually operative means for rotating said threaded rod in order to urge said intake valve member into closing relation with said first valve seat.

7. A safety valve for closed tanks, and more particularly for accumulation for water heaters, including a valve casing having a lateral inlet port and a lateral outlet port; a first valve seat in the valve casing communicating with the inlet port, said valve casing having a valve chamber between said first valve seat and said outlet port; an upper casing section for upwardly closing the valve chamber; a lower casing section having a further outlet port; a diaphragm disposed between said upper valve casing section and the lower casing section with the periphery thereof clamped therebetween and separating said valve chamber from said further outlet port; a substantially vertical tubular discharge member secured to the central portion of said diaphragm and projecting with its upper end into said upper casing section, and with its lower end into said lower casing section and communicating at its upper end with said valve chamber and at its lower end with said further outlet port; a second valve seat formed at the upper end of said tubular discharge member; a valve support mounted for vertical movement in said valve chamber; a discharge valve member carried by said valve support member above said tubular discharge member in effective position to cooperate with the second valve seat upon said tubular discharge member; a spring located in the upper casing section and biasing said valve support member downward, the latter having a hollow portion directed downward; an intake valve member disposed above the first valve seat communicating with said inlet port mounted for sliding movement in a hollow portion of said valve support member and adapted to be moved into closing position by said valve support member when the same moves downward; spring means located in said lower casing section abutting against a flange on said tubular discharge member and urging the same and said valve support member upwards against the action of said spring; a threaded vertical rod screwed into said upper casing section above said intake valve member; manually operative means for rotating said threaded rod in order to urge said intake valve member into closing relation with said first valve seat; a threaded portion upon the lower casing section; a hand wheel screwed on the threaded portion on said lower casing section; and means connecting the hand wheel with said tubular discharge member and effective to separate the latter from said discharge valve member when said hand wheel is screwed downward in order to drain said safety valve at will.

RENÉ EUGÈNE LÉON TRUBERT.

REFERENCES CITED

The following references are of record in the file of this patent:

UNITED STATES PATENTS

| Number | Name | Date |
| --- | --- | --- |
| 1,461,738 | Rumpf | July 17, 1923 |
| 1,637,085 | Nichols | July 26, 1927 |
| 2,053,931 | Work | Sept. 8, 1936 |
| 2,089,144 | Work | Aug. 3, 1937 |